Aug. 4, 1953     A. P. TURNER ET AL     2,647,416
FLEXIBLE DRIVE TRANSMISSION FOR MOTOR VEHICLES
Filed May 10, 1948     4 Sheets-Sheet 3
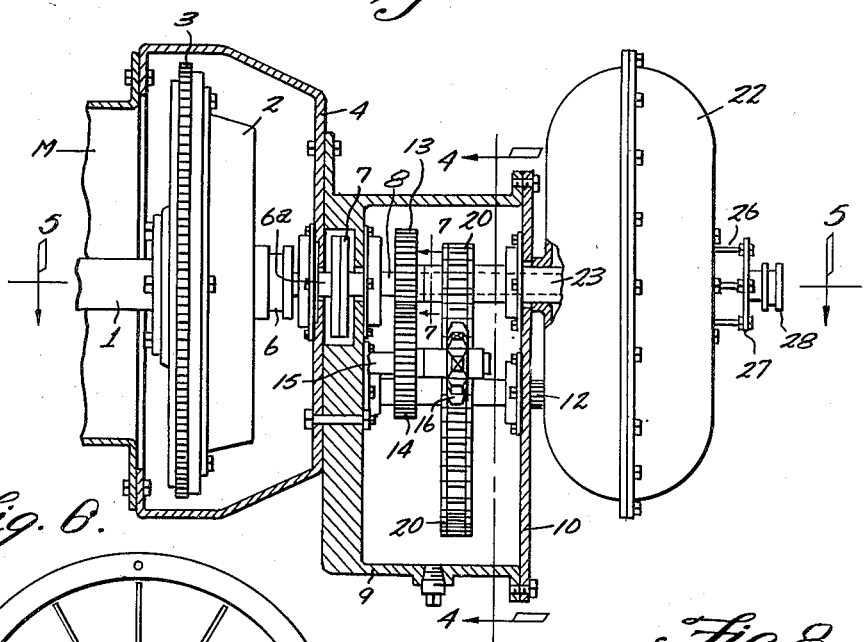
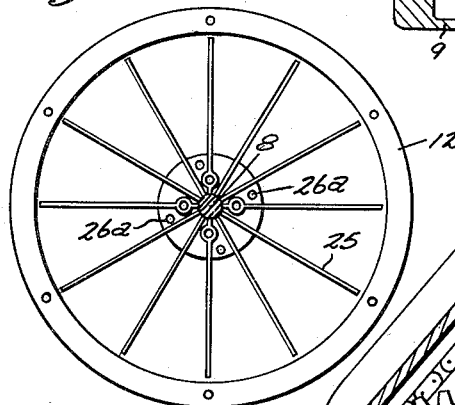
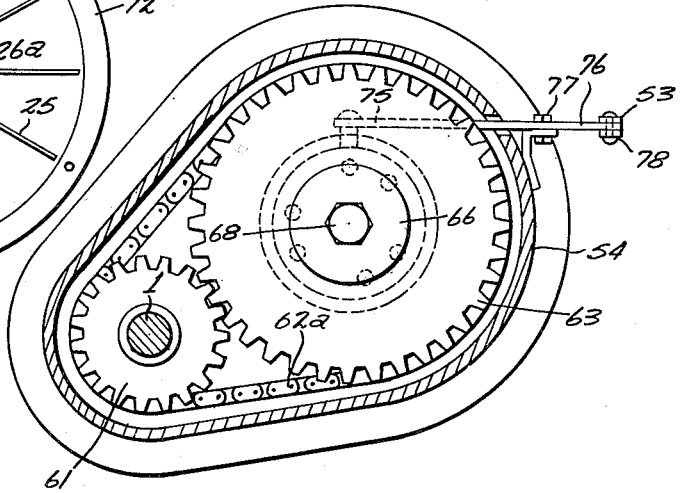
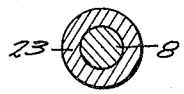
INVENTOR.
Archibald P. Turner,
Hamilton G. Blumberg
BY Victor J. Evans & Co.
ATTORNEYS INVENTOR.
Archibald P. Turner,
Hamilton G. Blumberg,
BY Victor J. Evans & Co.

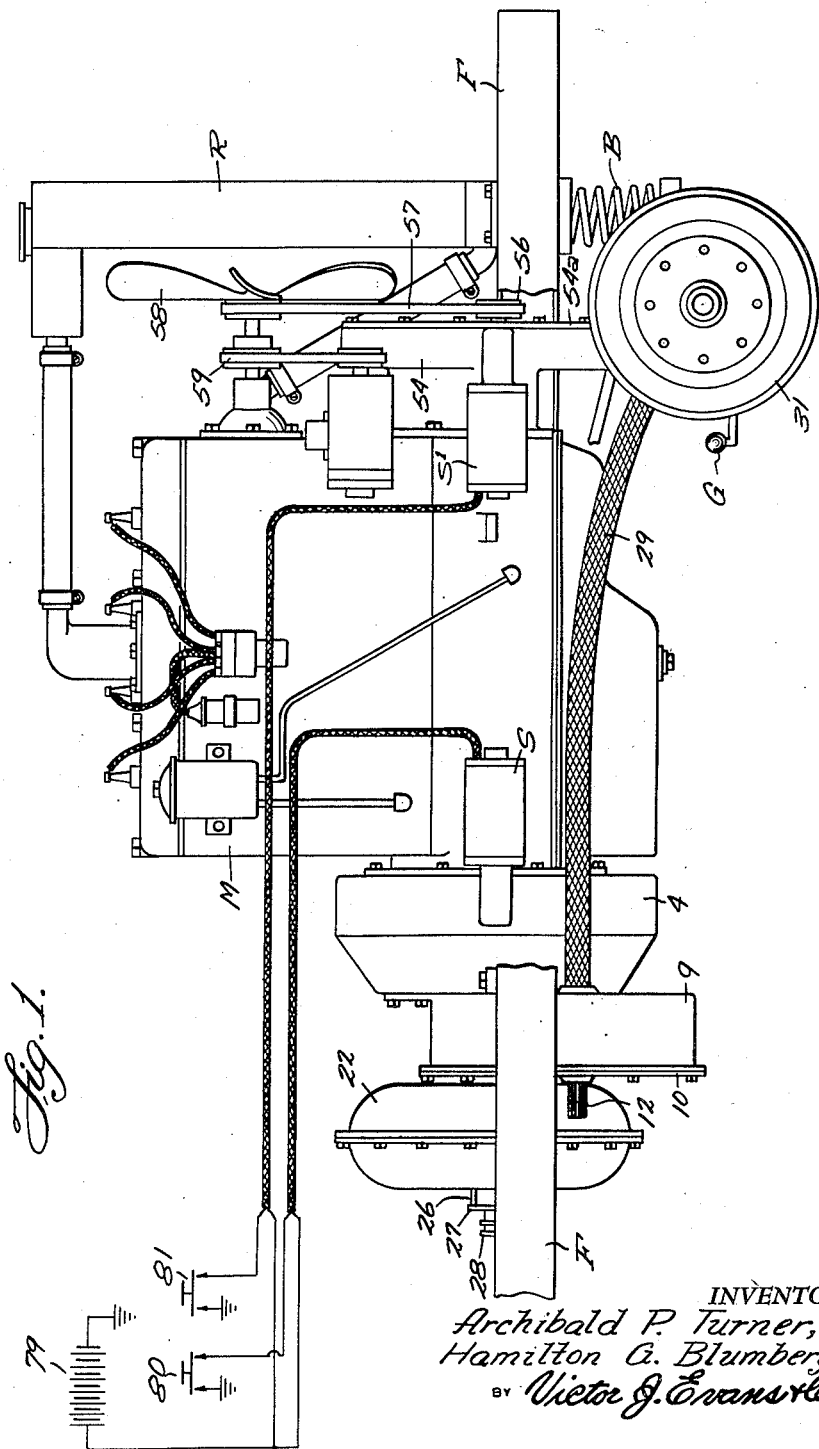

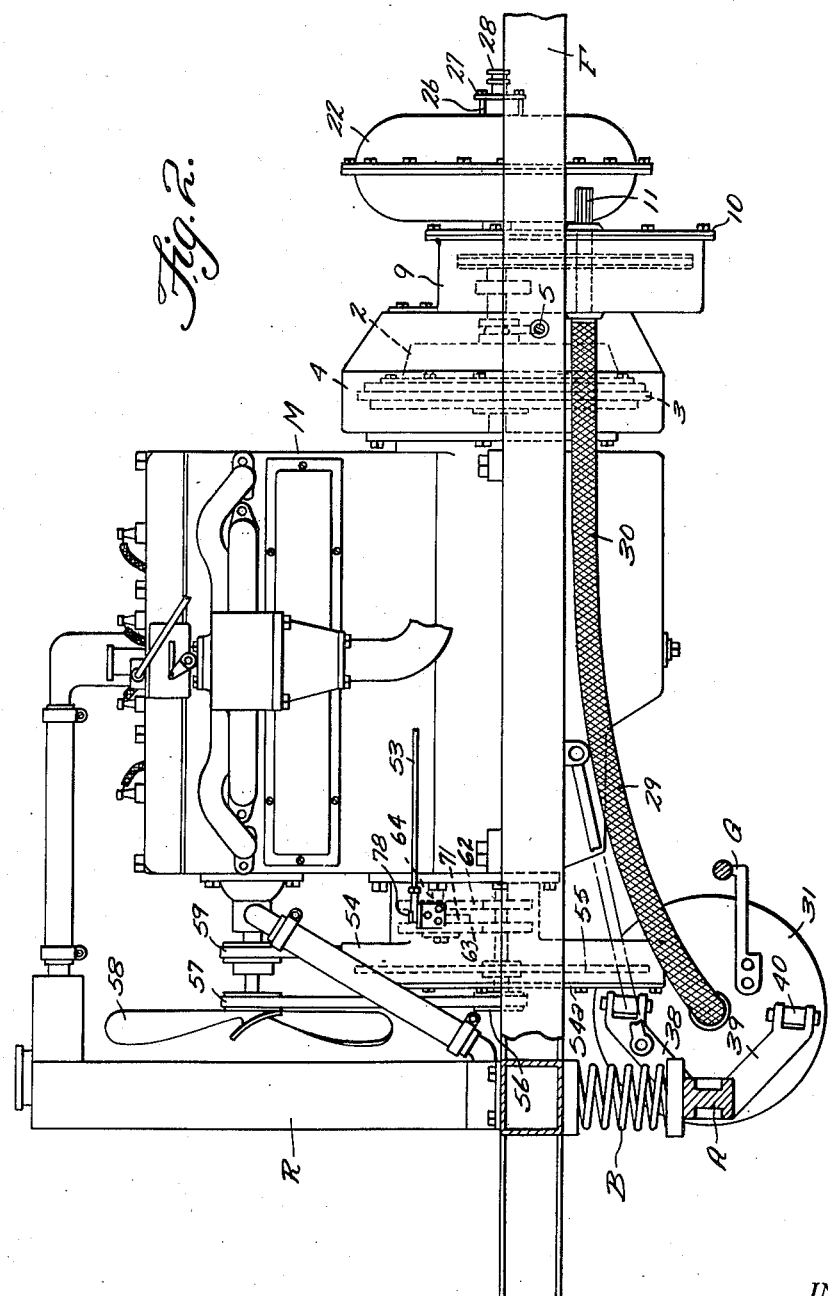

ATTORNEYS

Patented Aug. 4, 1953

2,647,416

UNITED STATES PATENT OFFICE 2,647,416

FLEXIBLE DRIVE TRANSMISSION FOR MOTOR VEHICLES

Archibald P. Turner and Hamilton G. Blumberg, San Antonio, Tex.

Application May 10, 1948, Serial No. 26,134

1 Claim. (Cl. 74—664)

The present invention relates to the general class of motor vehicles or automotive vehicles, of the stub axle type utilizing driven steering wheels, and more particularly to a power plant including a flexible drive transmission for automobiles and trucks having a motor reverse mechanism for forward and reverse drive of the vehicle.

From the power plant of a four wheel vehicle power may be transmitted and applied to the two front steering wheels as hereinafter illustrated, and in addition, if desired, power may also be transmitted and applied to the two rear wheels of the vehicle; in either installation numerous gear mechanism of many existing automotive vehicles is dispensed with and the transmission of power is simplified.

In carrying out the invention dual driving mechanism is employed including mechanical means and fluid pressure driving means for the traction wheels, and self-lubricated flexible driven shafts convey rotary motion and power to the two front driving and steering wheels of the vehicle.

A minimum number of standardized parts are employed which may with facility and low cost of production be manufactured, and the parts may be assembled with convenience, to equip a vehicle with smooth operating parts that are durable and reliable, and which may manually be controlled for facile maneuvers of the automotive vehicle.

The invention consists in certain novel features of construction and combinations and arrangements of parts as will hereinafter be described, and more specifically set forth in the appended claim.

In the accompanying drawings we have illustrated a physical embodiment of our invention in a four wheel vehicle having a front steering wheel drive, in accord with one mode we have devised for the practical application of the principles of our invention. It will however be understood that changes and alterations are contemplated and may be made in these exemplifying drawings and illustrated structures, within the scope of our claim without departing from the principles of our invention.

Figure 1 is a view in side elevation at the right hand front portion of an automotive vehicle equipped with the power plant of our invention, and indicating the push-button electrical controls for the transmission of power; and Figure 2 is a similar view at the left side of the vehicle with the left hand flexible shaft broken away and the right hand flexible shaft applied to the inner side of the right front wheel of the vehicle.

Figure 3 is a vertical longitudinal sectional view through the clutch housing and driving gear housing, and showing in full lines the fluid pressure or hydraulic differential gear case; at line 3—3 of Fig. 5.

Figure 6 is a detail view of one of the rotors of the differential fluid drive mechanism; and Figure 7 is a transverse sectional view through the extension shaft and its tubular shaft of the differential drive on the line 7—7 of Fig. 3, and Figure 8 is a vertical sectional view through the reversing gear box at the front of the motor or power plant.

In order that the general arrangement and relation of parts may readily be understood we have shown in the main assembly views, chassis or frame F of suitable type upon which the motor M and the radiator R are mounted at the front of the vehicle, wheel W, the front axle A with its spring B; a rear electric starter S for cranking the motor when the dual driving mechanism is in forward drive, and a front electric starter S' for cranking the motor when the reversing mechanism has been shifted for reverse drive, and the usual ball bearings or anti-friction bearings are indicated at D. With two starters the shifting of the reverse mechanism into operative or non-operative position is eliminated should the motor need cranking when the reverse mechanism is in operation. Other accessories or appliances for the operating parts of the equipment are shown, but not described, as they do not have direct bearing on the mechanisms and appliances of the invention.

In this physical embodiment of the invention, the disclosure is confined to the power plant located at the front of the vehicle for propelling the vehicle through the two front steering wheels at the opposite ends of the front axle A, and the same dual drive may be applied to the two rear wheels of the vehicle, or both the front and rear wheels of the vehicle may take power from the dual driving mechanism of the power plant.

Figure 4:
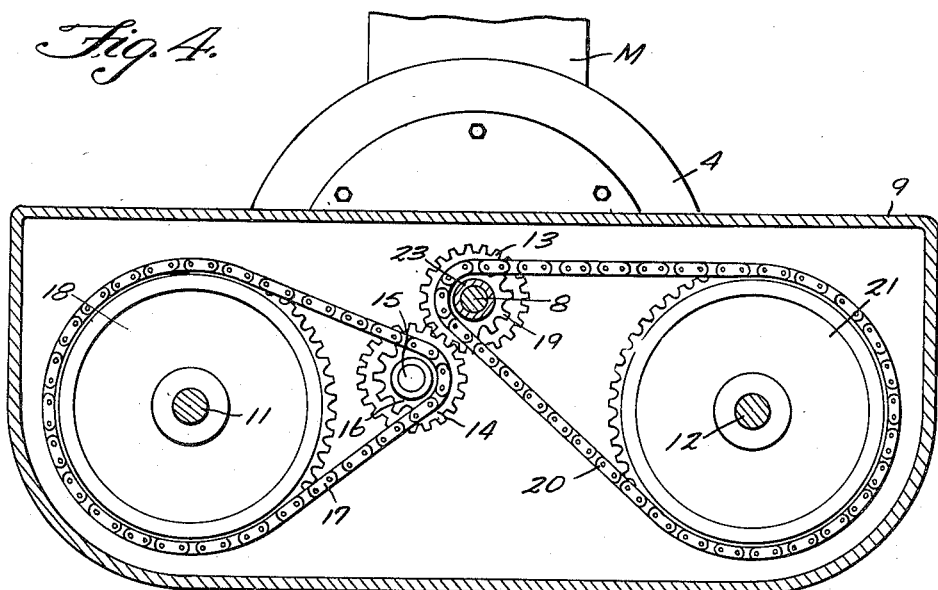
Figure 4 is a transverse vertical sectional view at line 4—4 of Fig. 3 disclosing the dual sprocket-chain drives for the two front wheels.
Figure 5:
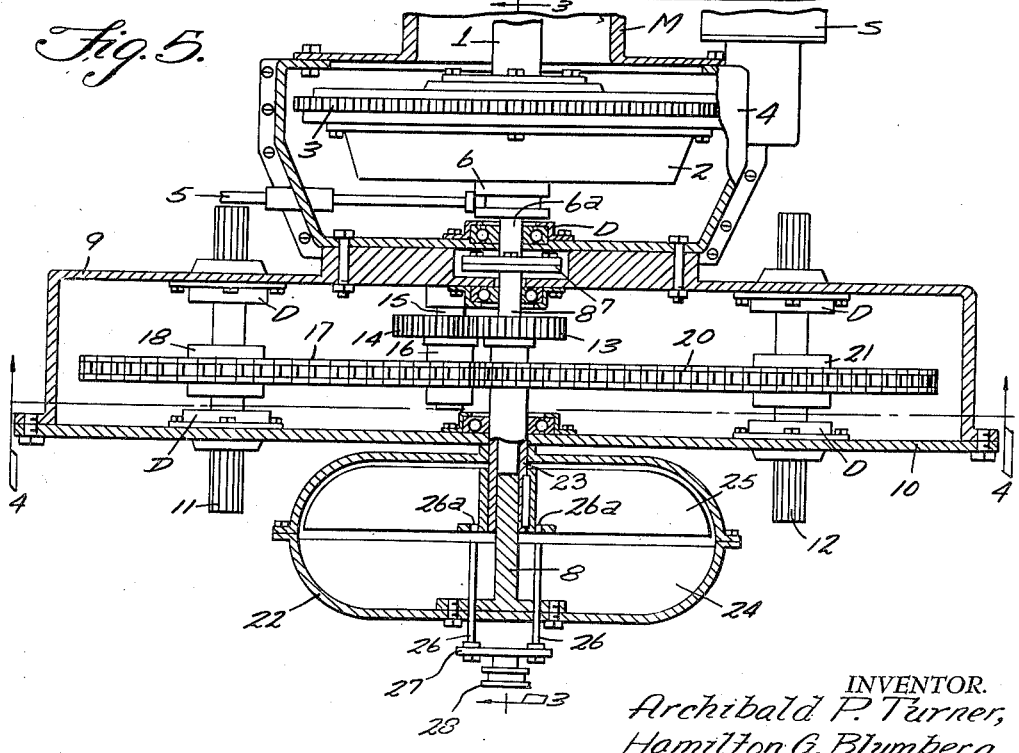
Figure 5 is a horizontal sectional view at line 5—5 of Fig. 3 depicting the differential fluid drive mechanism for the right front wheel.

The motor M of the power plant is equipped with a longitudinally extending crank shaft or main engine shaft 1, which as shown in Fig. 5 extends to the rear of the motor M, and is equipped with a suitable clutch 2 and ring gear 3 activated by the rear starter S, the clutch being located in a housing 4 attached at the rear end of the motor M. The clutch is provided with a throw-out or control lever 5 and sliding spool or collar 6, and its shaft 6a is flexible jointed at 7 to an axially alined extension shaft or power shaft 8, suitable bearings D being provided for the shafts as indicated.

A transversely arranged, upright drive housing 9 is rigidly bolted at the rear side of the clutch housing, and provided with a detachable cover plate 10, and at opposite sides of the longitudinal center of the vehicle, two laterally spaced, parallel splined jack-shafts 11 and 12 are journaled in bearings D of the housing. As here shown shaft 11 is designed to furnish motion and power to the left hand front wheel; shaft 12 is designed to supply power to the right hand front wheel; and if desired power may be taken off these two shafts for transmission to two rear wheels of the four wheel vehicle. The left hand front wheel is driven from shaft 11 through a gear couple constantly in mesh including gear 13 keyed on the shaft 8 and 14 on a stub shaft 15, mounted in the thickened inner wall of the drive housing, and a sprocket wheel 16 on shaft 15, and a sprocket chain 17 on the wheel 16 conveys power to the large sprocket wheel 18 to rotate the jack shaft 11 in its bearings D.

The right hand jack shaft 12 is similarly driven from sprocket wheel 19 rigid with the tubular shaft 23 concentric with and rotatable on shaft 8, through sprocket chain 20 that passes around the larger sprocket wheel 21 on the jack shaft or power take-off shaft 12.

For allowing the wheels at the sides of the vehicle to rotate at relatively different speeds, as in turning a corner, a hydraulic or fluid pressure coupling is enclosed within a casing 22 made up of two bolted sections, and rotatable at the rear side of the drive housing 9. For this purpose the power shaft 8 is provided with a tubular concentric shaft 23 rigid with sprocket 19, and the flanged end of shaft 8 is bolted against the inner face of the rotary housing or casing 22 that is provided with radial vanes 24. The tubular shaft 23 is provided with a keyed hub and rotor or wheel including the complementary radial vanes 25 which is driven by the impeller vanes 24 of the rotary housing through the motive fluid, as thick oil, or grease within the impeller housing that rotates with the shaft 8.

When desired, and to prevent spinning of the fluid drive, the impeller casing and the rotor are locked together by means of four slide bolts or pins 26 radially disposed about shaft 8, in the outer wall of the impeller casing or housing, for engagement in complementary sockets 26a of the hub of the rotor 25. The pins or bolts are rigid with a cross head 27 and its slide collar or spool 28 that is manually operated in suitable manner.

The two front steering wheels W are connected together by the usual steering rigging indicated at G, and power for the right hand front wheel is taken off the jack shaft 12 by a self-lubricated flexible shaft indicated as a whole by the numeral 29, while the left hand wheel is driven from jack shaft 11 by a duplicate flexible shaft 30. The fork end or yoke arms 38 and 39 of the axle A are swiveled by knuckle joints 40, and the axle is braced by the usual radius rods.

At the forward end of the power plant of the vehicle an electrically controlled motor reversing mechanism for the engine shaft or crank shaft 1 and for the timing mechanism of the usual cam shaft, are enclosed within a housing 54 that is bolted to the motor and provided with a removable front plate 54a as seen in Fig. 1.

A second, electrically operated starter, for the reversing mechanism, is indicated at S' for activating the ring gear 55 on the shaft 1, and the front extension of the shaft is equipped with a pulley 56 for the fan belt 57 that rotates the usual fan 58 at the rear of the radiator R; and in addition the usual belt drive 59 may be employed for the air-cooling fan 58.

For controlling the rotation of the cam shaft 64 a forward drive sprocket and a reverse drive pinion are operatively mounted thereon within the casing or reverse housing 54. The reverse drive pinion 61 is constantly in mesh with the reverse timing gear 63, and the forward drive sprocket behind pinion 61 is connected with the forward timing sprocket by the chain 62a (Fig. 8). This permits the clockwise rotation of the camshaft at all times.

The timing gear and sprocket are mounted upon a conventional cam shaft-extension between spaced retaining plates 66, and the assembly is secured and retained by means of a headed bolt 68 that is threaded in an axial socket in the end of the cam shaft.

For alternately coupling or clutching the crank shaft to timing sprocket 62 and gear 63, a shiftable clutch disk 71 is provided which is engaged by the fork or yoke 75 of a clutch lever 76 that extends through a slot in the wall of the reverse gear housing and is pivoted at 77, and the push and pull rod 53 is pivoted at 78 to the outer free end of the clutch lever.

The rod 53 may be manually operated to shift the clutch disk 71 to prevent change of the direction of rotation of the cam shaft 64 when the engine is driven reversely. In one direction of movement, the disk 71 will be clutched to the sprocket 62 to drive the cam shaft clockwise for forward direction of the vehicle, and in the other direction of movement the disk will be clutched to the gear 63 to drive the cam shaft in the same clockwise direction when the engine crank shaft is reversed for driving the vehicle in reverse direction.

In Fig. 1 a diagram of the electrical wiring is shown for electrical appliances and devices including a grounded battery 79 with push button controls on the dash board, as 80 for the starter S and 81 for the starter S', respectively which as previously stated will crank the engine in either forward or reverse drive.

Various other mechanical and electrical devices and appliances necessary for complete equipment and smooth operation of the automotive vehicle are shown, but as they are not necessary for an understanding of the invention they are not herein described.

Having thus fully described our invention, what we claim as new and desire to secure by Letters Patent is:

In driving mechanism for an automotive vehicle having a motor shaft and two spaced power take-off shafts, flexible drive shafts connecting the output shafts to the wheels of the vehicle, the combination with the motor shaft of a counter shaft, a gear couple between the shafts, a tubular shaft concentric with the motor shaft and a sprocket chain drive between the tubular shaft and one take-off shaft, a sprocket chain drive between the countershaft and the other take-off shaft, and a flexible motive fluid drive at the rear end of the motor shaft for coupling the motor shaft and tubular shaft.

ARCHIBALD P. TURNER.
HAMILTON G. BLUMBERG.

References Cited in the file of this patent

UNITED STATES PATENTS

| Number | Name | Date |
|---|---|---|
| 595,708 | Forsyth | Dec. 21, 1897 |
| 718,303 | Bassett | Jan. 13, 1903 |
| 1,095,132 | Thomson | Apr. 28, 1914 |
| 1,273,519 | Millington | July 23, 1918 |
| 1,301,232 | Debauge | Apr. 29, 1919 |
| 1,306,227 | Kane | June 10, 1919 |
| 1,442,057 | Eggert | Jan. 16, 1923 |
| 1,689,245 | Klimek | Oct. 30, 1928 |
| 1,817,974 | Douglas | Aug. 11, 1931 |
| 2,030,710 | Opolo | Feb. 11, 1936 |
| 2,075,564 | Alden | Mar. 30, 1937 |
| 2,212,453 | Perkins | Aug. 20, 1940 |
| 2,294,994 | Maze | Sept. 8, 1942 |
| 2,514,071 | Jusky | July 4, 1950 |

FOREIGN PATENTS

| Number | Country | Date |
|---|---|---|
| 285,970 | Great Britain | Feb. 23, 1928 |